UNITED STATES PATENT OFFICE.

D. W. CLARK, OF BENNINGTON, VERMONT.

IMPROVEMENT IN ENAMEL COMPOSITIONS FOR BRICKS, &c.

Specification forming part of Letters Patent No. 24,282, dated June 7, 1859.

*To all whom it may concern:*

Be it known that I, DECIUS W. CLARK, of Bennington, in the county of Bennington and State of Vermont, have invented, made, and applied to use a certain new and useful Improvement in Enamel or Glaze for the Surface of Pottery-Wares, Building Materials, and other Bodies; and I do hereby declare that the following is a full, clear, and exact description of the composition and manner of applying said enamel.

Previous to my invention various materials had been combined to form earthy compounds and vitrifiable glazes for the same, among which may be mentioned metallic salts and oxides, such as of lead, zinc, tin, &c. In all these instances, however, the metallic oxides have been mixed in small quantities, and mainly to act as a flux, or else to give color to the glaze, or both.

The nature of my said invention, therefore, does not consist in the use of these metallic oxides themselves; but after very extended experiments I have discovered that by the use of oxide of zinc as the principal base of the enamel, in connection with feldspar and borax or boracic acid, a glaze is produced that is much more beautiful in its appearance, durable in wear, and does not "craze" or become finely cracked in being vitrified. Hence the surface is more durable under any ordinary culinary operations, such as baking, &c.; and my glaze is cheap and of such a durable character that it can be applied to the surface of bricks or stones for building or to outside ornaments, rendering them water-proof and exceedingly durable.

In order to form the most beautiful glaze, I make use of the following materials in the proportions set forth, the proportions of oxide of zinc, boracic acid, and feldspar, which form the base of my compound, being also specified: four pounds eleven ounces refined boracic acid, four pounds eleven ounces refined oxide of zinc, seven pounds eight ounces calcined and ground feldspar, six pounds nine ounces calcined and ground quartz, six pounds eight drams washed paris-white, one pound two ounces washed kaolin or china-clay, and one-fourth dram oxide of cobalt; the above ingredients to be mixed, screened, and placed in a seggar or other vessel lined with ground flint or quartz, and so covered as to exclude flame, and to be placed in a kiln or oven and burned until the said ingredients or materials are fused, then taken out and ground in water to a pulp of impalpable powder of about the consistency of thin cream. Then dip or immerse the body or surface to be covered with the enamel or glaze into the substance thus prepared, allowing it to remain a greater or less space of time, according to the density of the material of the body or surface to be covered and the thickness of enamel or glaze required, to be regulated by the judgment of those applying it skilled in the art of dipping or glazing wares and bodies. The body or surface thus covered is to be exposed to the action of heat by being burned in an oven or kiln, the enamel or glaze to be protected by seggars or otherwise, so that it shall not be reacted or directly acted upon by the flame, and to be thus burned or baked a greater or less time, according to the amount of heat applied, and varying according to the requirements of the body or substance to which the said enamel or glaze is applied, to be governed and regulated by the judgment of the person having charge of the burning or baking process and skilled in such art.

The exact proportions of the oxide of zinc, borax or boracic acid, and feldspar may be slightly varied, as well as the proportion of ingredients mixed with them, as a variety in the color may be produced by the addition of other articles.

What I claim as my invention, and desire to secure by Letters Patent, is—

The enamel or glaze for pottery-ware or other articles, formed of the ingredients and substantially as specified.

DECIUS W. CLARK.

Witnesses:
JAS. L. STARK, Jr.,
I. HALSEY CUSHMAN.